Aug. 29, 1939.  J. WEBER, JR., ET AL  2,171,464
BLANKING MACHINE
Filed Aug. 24, 1936  4 Sheets-Sheet 4

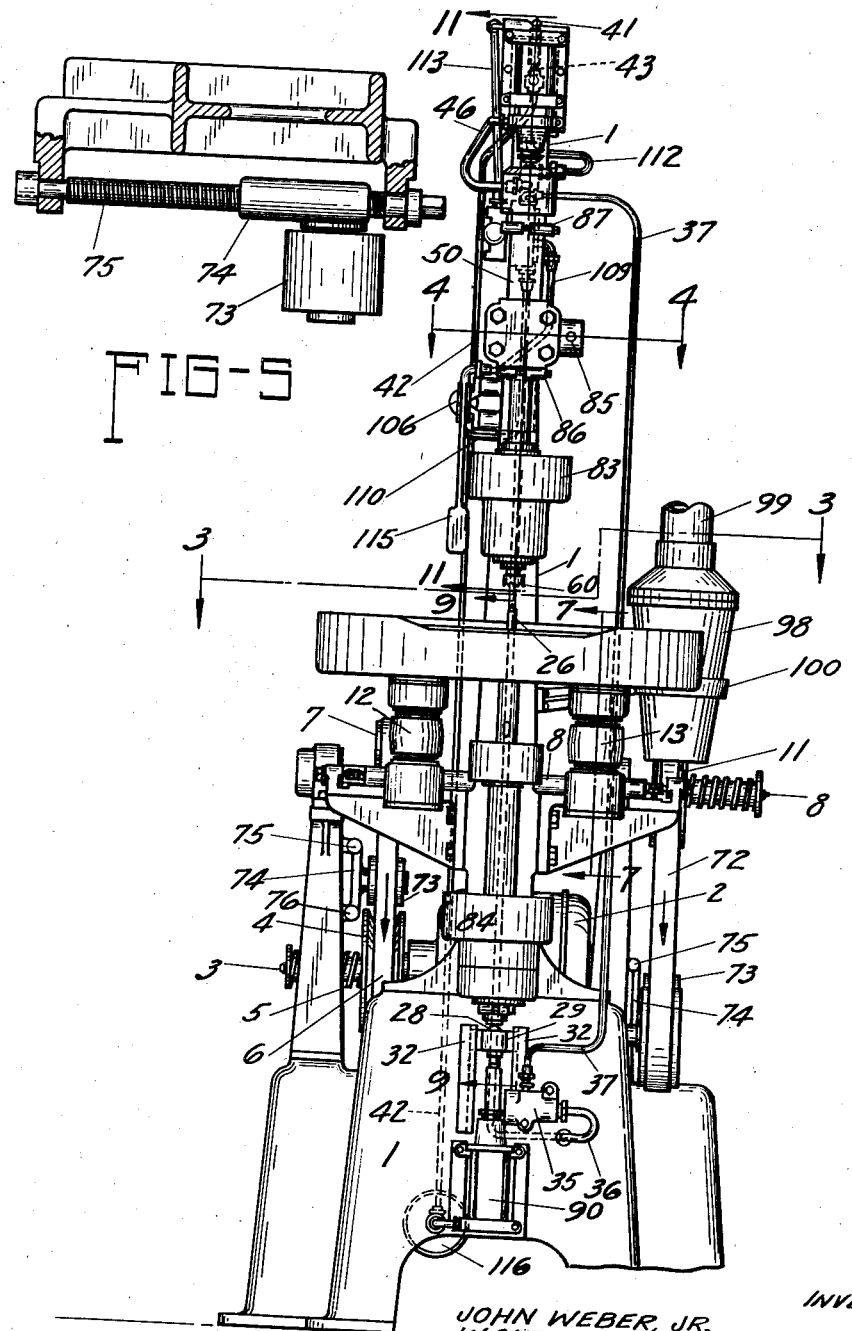

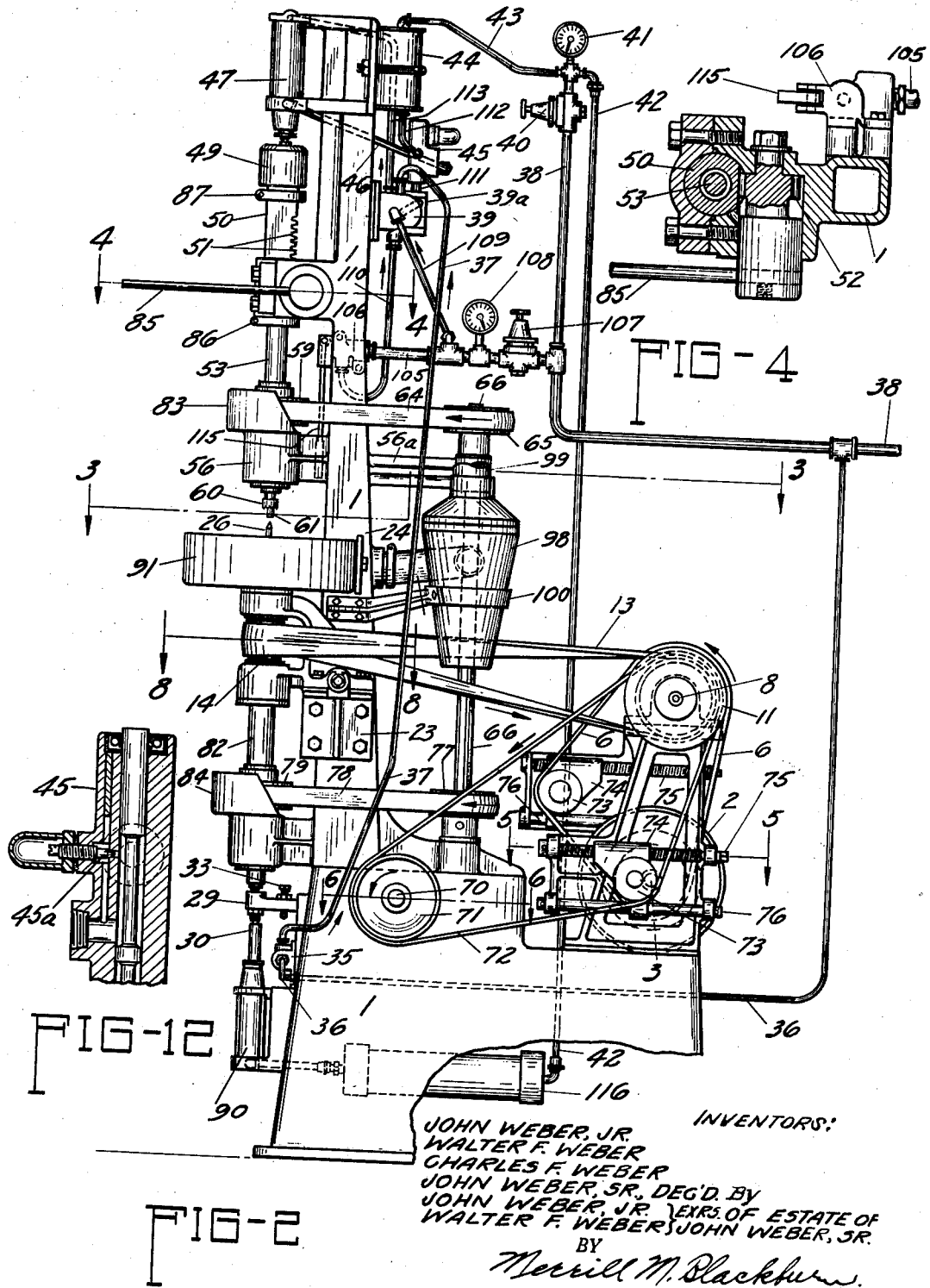

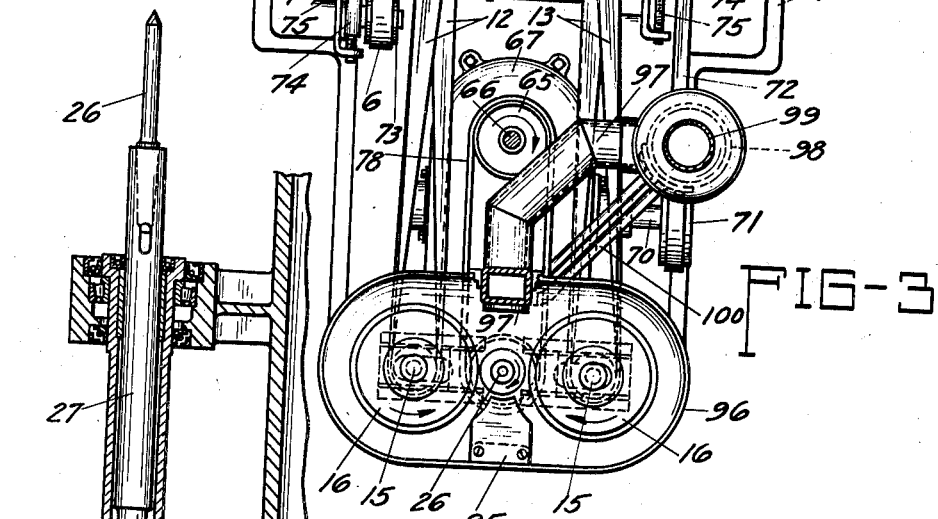

INVENTORS:
JOHN WEBER, JR.
WALTER F. WEBER
CHARLES F. WEBER
JOHN WEBER, SR. DEC'D. By
JOHN WEBER, JR.  EXRS. OF ESTATE OF
WALTER F. WEBER  JOHN WEBER, SR.
BY
Merrill M. Blackburn
ATTORNEY.

Patented Aug. 29, 1939

2,171,464

UNITED STATES PATENT OFFICE 2,171,464

BLANKING MACHINE

John Weber, Jr., Walter F. Weber, and Charles F. Weber, Muscatine, Iowa, and John Weber, Sr., deceased, late of Muscatine, Iowa, by John Weber, Jr., and Walter F. Weber, executors, Muscatine, Iowa Application August 24, 1936, Serial No. 97,650

14 Claims. (Cl. 79—7)

The present invention pertains to a blanking machine and more especially to a machine for forming button blanks. It is intended particularly for operation upon pearl material, such as the shells from fresh water mussels. Among the objects of this invention are to provide a machine by means of which additional button blanks may be produced from what has heretofore been regarded as refuse; to provide a machine for the purpose indicated which is readily adjustable to produce blanks of various sizes, depending upon the size of the usable material which has been left from prior cutting operations; to provide a machine for the purpose indicated which will be useful in working upon shells of any size; to provide a machine with which blanks of irregular contour may be produced; to provide a machine for the purpose indicated which is efficient in operation; to provide a machine in which the danger of injury to the operator's hand is reduced to a minimum; to provide a generally improved structure for the purpose indicated; and such further objects, advantages, and capabilities as will hereafter appear and as are inherent in the construction disclosed herein. Our invention further resides in the combination, construction, and arrangement of parts illustrated in the accompanying drawings and, while we have shown therein a preferred embodiment of our invention, we desire the same to be understood as illustrative only and not as limiting our invention.

In the accompanying drawings illustrating this invention—

Fig. 1 represents a front elevation of one embodiment of our invention;

Fig. 2 represents a side elevation of the structure shown in Fig. 1;

Fig. 3 represents a horizontal section taken substantially along the broken plane indicated by the line 3—3, Fig. 1;

Fig. 4 represents a transverse section taken approximately along the plane indicated by the line 4—4, Fig. 2;

Fig. 5 represents a transverse section taken substantially along the plane indicated by the line 5—5, Fig. 2;

Fig. 6 represents a transverse section taken approximately along the plane indicated by the line 6—6, Fig. 2;

Fig. 9 represents a vertical section taken approximately along the plane indicated by the line 9—9, Fig. 1;

Fig. 10 represents a partial transverse section taken substantially along the plane indicated by the line 10—10, Fig. 9;

Fig. 12 represents a longitudinal section of a valve shown in the upper part of Fig. 2.

Figure 7:
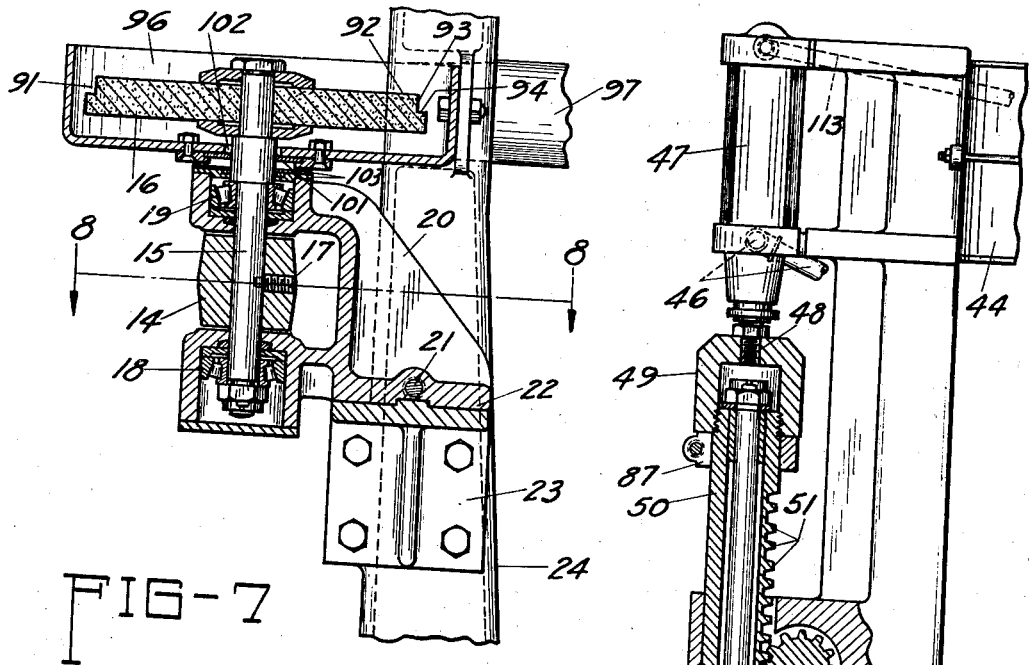
Fig. 7 represents a vertical section taken approximately along the plane indicated by the line 7—7, Fig. 1.

Reference will now be made in greater detail to the annexed drawings for a more complete description of this invention. A supporting unit or framework is indicated, in general, by the numeral 1. On and within this supporting unit are mounted all of the parts, except the suction apparatus, referred to more particularly hereinafter, and a source of compressed air for the operation of various valves and pistons. The source of power for the operation of the various mechanical elements upon this supporting unit is a motor 2 whose shaft is indicated at 3. On this shaft is mounted a variable speed pulley 4 which comprises a pair of relatively movable flanged units, one of which is pressed toward the other by a spring 5. A belt passes over this pulley and the pulley 7, mounted on the main shaft 8. On this main shaft 8, besides pulley 7, are pulleys 9, 10, and 11, the latter being similar to pulley 4 and actuated in the same way by a spring 5.

Belts 12 and 13 connect a pair of pulleys 14 to the pulleys 9 and 10 and are twisted ninety degrees (90°) in opposite directions so as to give opposite rotation to the shafts 15 which carry the grinding wheels 16. The pulleys 14 are secured to the shafts 15 by means of set screws 17 so that the pulleys will be sure to drive the grinding wheels 16. The shafts 15 pass through bearings 18 and 19, and these bearings are carried by laterally movable brackets 20 actuated by screws 21 threaded in the base plates 22. The base plates 22 are grooved on the under side and slide on the brackets 23 bolted to the upright 24 which constitutes a part of the supporting unit 1. The base plate 22 is clamped to the bracket 23 by the bolts 25 and is thus securely held in adjusted position. Since one of these adjusting means is provided for each grinding wheel 16, it is possible to adjust these grinding wheels relatively to each other to secure the desired positioning thereof.

Between the grinding wheels is a pointed spindle 26 which is both rotatable and reciprocable. Preferably the spindle is made of two parts, as shown in Fig. 9, and the upper part is received in the hollow end of the lower part in a manner well known to machinists in connection with various tools, the end of the lower part forming a chuck to hold the upper part. The bracket 29 is shown as having a ball 28 in its upper face which supports the lower end of the shaft 27. The bracket 29 is carried by the screw-threaded end of a piston rod 30. A lock nut 31 serves to hold the bracket 29 and the piston rod 30 in relatively adjusted position. The free end of the bracket 29 is slidable in a groove between a pair of projections 32 upon the front of the base sections of the supporting unit 1. A collar surrounding the lower end of shaft 27 limits the upward movement thereof.

A bolt 33 extends through the bracket 29 and may be secured in adjusted position by means of the lock nut 34. An air valve 35 is mounted upon the front of the base section below the bracket 29, and has connected thereto the compressed air pipes 36 and 37, the former of which is connected to a pipe 38 leading from a source of compressed air. It is therefore obvious that when the valve 35 is opened by being actuated by the screw 33 the compressed air will be permitted to flow through the pipe 37 into the valve 39.

The pipe 38 also leads to a pressure-regulating valve 40 which is preferably set for operation to give a fifteen pound pressure upon the opposite side from the entrance of the pipe 38. A pressure gauge 41 shows what the pressure is upon this side of the valve 40 and, therefore, the valve may be regulated, if needed, to give the desired pressure. It is also apparent that the pressure in pipes 42 and 43 will be the same as that indicated by the gauge 41. The air from pipe 43 enters tank 44 and exerts a pressure upon oil contained therein to force the oil through a valve 45 and from this through a pipe 46 to the lower end of the cylinder 47 and below a piston contained therein. This piston is carried by a piston rod 48 whose exterior end is screw-threaded and connected to the cap 49. This cap has screw-threaded connection to a sleeve 50 provided upon one side with a rack 51 engaged by a pinion 52, as shown most clearly in Fig. 11.

An upper spindle 53 is mounted in the sleeve 50 and has end and lateral thrust bearings to provide for ready rotation of the spindle within the sleeve. Upon the lower end of the spindle is a sleeve 54, and the two are secured together by a key 54a so that they are relatively non-rotatable but slidable. A sleeve 55, mounted in a bracket 56 projecting from the supporting unit 1, furnishes a bearing for the sleeve 54 and lateral support for the lower end of the spindle 53. A key 57 and set screw 58 connect the sleeve 54 and the pulley 59 so as to prevent relative movement thereof.

The lower end of the spindle 53 serves as a chuck for the gripping tool 60 which is hollow and has a holding member 61 therein, pressed outwardly by a spring 62. The lower face of the tool 60 has teeth 63 which engage the shell to cause rotation thereof about the axis of the spindles 26 and 53. These tools 60 may be of different sizes for use in the grinding of different sized blanks. The operation of these will be given more in detail hereinafter. A belt 64 drives the pulley 59 and the spindles 53 with its connected parts. The belt 64 is shown as passing over a pulley 65 mounted on a shaft 66 which has a bearing in a casing 67 and in an arm 56a. Within the casing 67 and mounted on the shaft 66 is a worm wheel 68 which is driven by the worms 69 on the shaft 70. This shaft is mounted in anti-friction bearings, as shown most clearly in Fig. 6. In practice, the worm 69 may be a four-thread worm of high pitch rather than the single thread worm shown herein for the sake of clearness.

The belt pulley 71, mounted on the shaft 70, is driven by a belt 72, passing over and driven by the pulley 11, referred to above. An adjustable idler pulley 73 is carried by the block 74 which may be adjusted by means of the screw 75. The mounting of this screw will be obvious from a study of Figs. 2 and 5. When the screw 75 is operated to tighten the belt 72, the belt is drawn between the flanges of the pulley 11, causing them to spread and thus decreasing the pitch diameter of the pulley 11 and the speed of the shaft 70 and, hence, of the spindles 26 and 53. A plain rod 76 serves as a lower guide for the block 74, as clearly appears from Fig. 2. Naturally, when the tension on belt 72 is decreased, the speed of spindles 26 and 53 is increased.

The belt 6 is provided with a tension adjusting mechanism similar to that described in connection with belt 72, with the result that the speed of the main drive shaft 8, relatively to the motor shaft, may be adjusted by adjusting the tension on the belt 6.

A lower pulley 77 is mounted on and rigidly connected to the shaft 66, the same as pulley 65. This pulley 77 is connected in driving relation by a belt 78 to a pulley 79 which is connected by a key 80 and a set screw 81 to the tubular member 82 surrounding part 27 of the spindle 26. It will therefore be apparent that driving of shaft 70 causes rotation of shaft 66 and pulleys 65 and 77. The rotation of these pulleys causes rotation of the upper and lower spindles, thus causing rotation of the shell material about the axis of the spindles, to present different parts thereof to the grinding wheels to be ground. Guards 83 and 84 are provided for the upper and lower pulleys 59 and 79 and the belts 64 and 78, in order to guard against injury to the operator.

As shown in Figs. 9 and 10, key-ways are cut in opposite sides of the element 27 for the reception of keys 104 which are secured to the inner surface of the sleeve 82. This insures that the rotary motion of the pulley 79 will be transmitted to the spindle 27 and that the spindle will have the required amount of sliding motion with relation to the sleeve 82 so that the point of spindle 26 will be below the level of the grinding faces 94.

Figures 8, 11:
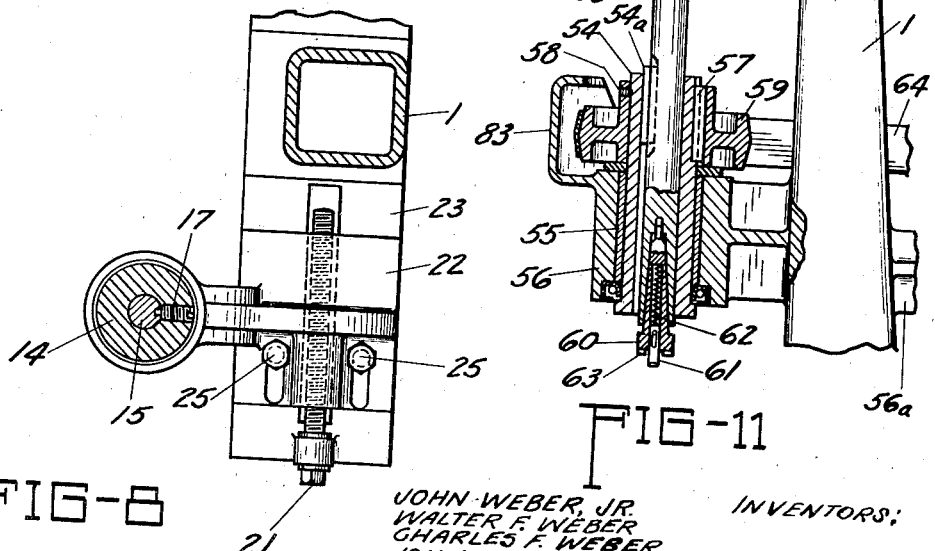
Fig. 8 represents a transverse section taken approximately along the plane indicated by the line 8—8, Fig. 7.
Fig. 11 represents a vertical section taken approximately along the plane indicated by the line 11—11, Fig. 1.

A handle 85 is connected to the pinion 52 for reciprocation of the sleeve 50, as shown most clearly in Figs. 4 and 11. A collar 86, clamped tightly about the sleeve 50, limits the amount of upward movement of the spindle 53, while a similar collar 87 serves in the same capacity for the downward movement of the spindle. The purpose of the handle 85, rack 51, and pinion 52 is to force the holding unit 61 against the shell material to hold same in proper position when positioned for the grinding operation. It is apparent that the operator may insert the shell material between the elements 26 and 61 and then pull down on the handle 85, forcing holding unit 61 into contact with the material to be operated upon. When this is done, the material is gripped between these parts and held in position, but is not rotated while the operator holds the material. However, when the operator lets go of the material and brings the handle 85 down farther, the tool 60 engages the material and the teeth 63 grip the surface thereof to cause the same to rotate with the spindle 53. Now, in order to carry the shell material into contact with the grinding wheels, air is let into the top of cylinder 47 and presses against the piston therein to force the same and the spindle 53 downwardly. The downward pressure in this cylinder is in excess of the upward pressure in the cylinder 90 and this, therefore, forces the spindle 26 to retract, permitting the shell material to move down into contact with the upper faces of the grinding wheels 16.

The grinding wheels 16 have notches 91 in the upper edge thereof to form a stepped grinding surface. The bulk of surplus shell material is cut away by the upper horizontal faces 92 of the grinding wheels, while the lateral edges of the blanks are ground down to shape by the vertical faces 93 and undesirable projections from the bottoms of the blanks are ground off by the faces 94.

Suitably shaped interchangeable spring arms 95 are mounted within the casing 96 in which the grinding wheels 16 are housed. These spring elements 95 are to insure that the blanks, when released by retraction of the spindle 53, will not fall into the near side of the casing 96 but will tip up and expose more surface to the air current passing through the suction tube 97. These blanks will then be drawn into the trap 98, along with the grindings cut away from the shell material by the grinding wheels. The trap 98 is connected to the suction pipe 99 which leads to any suitable suction apparatus, not illustrated. The size and shape of the trap 98 results in reduction of speed of the air in the trap and, consequently, the blanks fall to the bottom of the trap and are not carried into the pipe 99 as is the powdered material removed by the grinding wheels. However, if it should be found necessary, a coarse mesh screen can be inserted in the upper portion of the trap 98 to insure that none of the blanks will be carried through with the air current. The bottom end of the trap 98 is closed by any suitable means to normally prevent passage of air therethrough which would reduce the suction through the pipe 97. This means should preferably be such as will open automatically when a predetermined weight collects in the trap and will then close automatically when all or part of the load has been discharged. These blanks drop into any suitable receptacle at the bottom of the trap. Any suitable support 100 is connected to the supporting unit 1 and supports the trap with relation thereto. Casing 96 is provided with a suitable cover having a central opening for the shells to pass through.

Slides 101 (see Fig. 7) surround the shafts 15 and cover the slots 102 in the bottom of the casing 96 to insure that grindings will not drop down and work into the bearings for shaft 15. A substantially dust-proof cover 103 surrounds the shaft 15 and assists in keeping dust out of the bearings.

A branch pipe 105 connects the pipe 38 with a valve 106 and has connected therewith a pressure valve 107 and a gauge 108. A branch pipe 109 connects the pipe 105 with the valve 39, and a pipe 110 leads from the valve 106 to the valve 39. A slide valve member is located in valve 45, as shown in Fig. 12, and a piston in member 39a. These two parts are connected by a piston rod in connection 111. A needle valve 45a regulates the rate of flow of oil through valve 45 and therefore the rate of movement of spindle 53. A pipe 113 leads from the valve 39 to the upper end of the cylinder 47 and carries air, under a pressure of approximately seventy pounds to the upper end of this cylinder to press against the piston therein. When it is desired to turn the air pressure into the upper end of the cylinder 47 to force the spindle 53 downwardly, the lever 115 is pushed rearwardly and this opens the valve 106. This permits air, under a pressure of approximately seventy pounds in the pipe 105, to enter the pipe 110 and valve 39. This air pressure forces the slide in valve 39 to move longitudinally so as to permit air passing through pipe 109 to pass through the valve 39 and out through pipe 113 to the upper end of the cylinder 47. When the spindle 53 has been depressed through this action until all of the surplus material has been ground away, spindle 26 will have been depressed until bolt 33 actuates the trip member of valve 35 letting air pass through pipes 36 and 37 to cause movement of the slide member in valve 39 in the opposite direction from what it moved before so as to relieve the pressure in the upper part of cylinder 47. Now, the air under approximately fifteen pounds of pressure in pipe 43 presses downwardly on the oil in reservoir 44 and forces this through pipe 112, valve 45, and pipe 46 into the lower part of cylinder 47 to cause the piston therein to be raised. This raises spindle 53. A cylinder 116, connected between the pipe 42 and the cylinder 90, serves as a reservoir into which air may be backed from the cylinder 90 without greatly increasing the pressure in the pipe line. The air in cylinder 90 is under a substantially constant pressure of approximately fifteen pounds, and this results in the shells and blanks being held by parts 60, 61, and 26 under a substantially constant pressure which would not be true if a spring were used to return the spindle to its upper limit. When spindle 53 is withdrawn, the air pressure in cylinders 90 and 116 returns spindle 26 to its upper position, ready to receive the next shell. After spindle 26 stops in its upward travel, spindle 53 continues for about one inch more to make room for the insertion of the next shell.

The operation of the machine will now be briefly set forth. When the handle 85 (see Fig. 2) is pulled downwardly, the upper spindle 53 is moved downwardly causing the member 61 to engage the work and force same into contact with the pointed member 26. However, the handle 85 is not pulled downwardly far enough to cause the member 60 to engage the work. When the work is properly positioned, the handle 115 is actuated and this causes the automatic hydraulic mechanism to be put into operation. Because of this, greater pressure is produced in cylinder 47 than in cylinder 90 with the result that members 60 and 26 are forced downwardly causing the work to engage the grinding wheels 16 to be operated upon. Reverse movement occurs when the bolt 33 actuates the trip member of valve 35 letting air pass through the pipes 36 and 37 to cause movement of the slide member in valve 39 in the opposite direction from what it moved before so as to relieve the pressure in the upper part of cylinder 47. The pistons now move in the opposite direction so as to get ready for the next operation of the machine.

Because of the fact that the several valves 35, 39, 40, 106, and 107 are standard valves purchasable upon the open market, it is not deemed necessary that these be disclosed in detail herein, a disclosure of their respective functions being deemed sufficient.

Various changes may be made in the construction of this machine and it is therefore understood that the specific description of structure set forth above may be departed from without departing from the spirit of our invention as set forth in this specification and the appended claims.

Having now described our invention, we claim:

1. A machine for the purpose indicated comprising a pair of grinding wheels spaced apart a suitable distance to simultaneously operate upon opposite portions of shell material to produce a blank of the size desired, a holding spindle between the wheels and movable transversely of the plane of rotation of the wheels, fluid pressure means for normally advancing the point of the spindle beyond the surface of the grinding faces of the wheels, fluid pressure means opposing the first named pressure means and capable of exerting greater pressure than the first named pressure means, manual means for causing the second mentioned fluid pressure means to overcome the pressure of the first mentioned fluid pressure means, and actuating mechanism to cause rotation of said grinding wheels.

2. In a machine for forming button blanks, the combination of a pair of oppositely rotating, approximately horizontal grinding wheels having their upper faces in approximately the same plane; a pointed, material-holding spindle positioned substantially midway between the wheels, fluid pressure mechanism normally urging said spindle upwardly to position the material above the level of the grinding wheels, said fluid pressure mechanism comprising a cylinder and a piston reciprocating relatively with respect to one another in a vertical direction; a second spindle coaxial with the first spindle and located above the same, the second spindle, when in inoperative position, being separated vertically from the first spindle, fluid-pressure mechanism to actuate the second spindle toward the first spindle, the second mentioned fluid-pressure mechanism, during the grinding operation, exerting a greater pressure than the first mentioned fluid-pressure mechanism, thereby causing movement of advancement of the second spindle and retraction of the first spindle, and operating means for rotating the grinding wheels and the spindles, independently of any axial movement of the spindles.

3. In a button blanking machine, a supporting framework, approximately parallel shafts supported thereby for rotation about approximately vertical axes, grinding wheels mounted on the shafts with their upper grinding faces in approximately the same plane, material-holding elements substantially centrally placed with relation to the proximate faces of the wheels, one of said material-holding elements having a pointed end held above the plane of the grinding faces when in inoperative position, the last mentioned holding element being pressed upwardly by fluid pressure, the second material-holding means being spaced upwardly from the first holding means, when in inoperative position, manual means for actuating the second mentioned holding means toward and away from the first holding means, and fluid-pressure mechanism for causing reciprocation of the second holding means to cause material held thereby to be forced into engagement with the grinding wheels.

4. A button blanking machine comprising a supporting framework, a lower rotatable material-positioning spindle mounted on the framework, an upper rotatable material-positioning spindle, coaxial with the first mentioned spindle and carried by the framework, grinding wheels spaced laterally from the axis of the spindles and working conjointly to produce a single blank, the second mentioned spindle having, adjacent its lower end, a rough material-engaging face whereby the material may be engaged and caused to rotate with the spindles when the second mentioned spindle is depressed, and hydraulic means for depressing the second mentioned spindle and forcing the material against the grinding faces of the grinding wheels.

5. In a button blanking machine, a pair of horizontally arranged, shell grinding wheels; a work-holding spindle, symmetrically arranged between the wheels and depressable by fluid pressure from above; a second spindle cooperating with the first-mentioned spindle in holding work; a valve-tripping unit below one of the spindles and actuated thereby to be caused to actuate a valve upon depression of the spindle; and a valve below the tripping unit to be engaged and operated thereby.

6. A structure as defined by claim 5 in combination with a second spindle coaxial with the first named spindle, said second spindle serving to engage a shell placed on the first spindle and grip same to cause rotation thereof, said second spindle being depressable by a force sufficient to force the first spindle downwardly and the shell into engagement with the grinding wheels, whereby to cause the shell to be ground by the grinding wheels.

7. In a button blanking machine, a pair of grinding wheels, each wheel having a substantially flat grinding face and a groove in the edge adjacent the grinding face forming a stepped grinding surface, shafts for supporting and rotating said grinding wheels in proximity to each other and with their flat faces in substantially the same plane, a pair of coaxial, rotatable, reciprocable spindles to hold the work, rotate same, and force it against the grinding wheels to cause the work to be ground thereby, in combination with manual actuating means for the upper spindle to force the same into engagement with the work so that the work will be held by the spindles, and fluid-pressure means to cause reciprocation of the upper spindle.

8. In a button blanking machine, a pair of grinding wheels, each wheel having a substantially flat grinding face and a groove in the edge adjacent the grinding face forming a stepped grinding surface, shafts for supporting and rotating said grinding wheels in proximity to each other and with their flat faces in substantially the same plane, a pair of coaxial, rotatable, reciprocable spindles to hold the work, rotate same, and force it against the grinding wheels to cause the work to be ground thereby, in combination with fluid-pressure means, controllable manually to cause advancing movement of the spindles, and automatically functioning mechanical means for hydraulically controlling said fluid-pressure means to cause reverse movement of said spindles.

9. In a button blanking machine, a pair of grinding wheels, each wheel having a substantially flat grinding face and a groove in the edge adjacent the grinding face forming a stepped grinding surface, shafts for supporting and rotating said grinding wheels in proximity to each other and with their flat faces in substantially the same plane, suction mechanism having its inlet opening in proximity to the grinding wheels to withdraw grindings and the completed blanks, a pair of coaxial, rotatable, reciprocable spindles to hold the work, rotate the same, and force it against the grinding wheels to cause the work to be ground thereby, in combination with both manual and fluid-pressure actuating means for the upper spindle to force the same into engagement with the work so that the work will be held by the spindles and rotated thereby in engagement with the grinding wheels.

10. A machine for cutting button blanks from shells which comprises a grinding wheel for cutting away surplus shell material, a retractile spindle for engagement with a shell to assist in holding the shell in place to be operated upon, and actuating mechanism for pressing the shell against the spindle to cause retraction of the latter and to force the shell against the grinding wheel, said actuating mechanism having a pair of engaging means to engage the shell material, one of said means being hollow and having the other means mounted therein, retractibly, one of the engaging means engaging the shell and coöperating with the retractile spindle to hold the shell without rotating it and then receding into the second engaging means upon an increase of pressure upon the shell material so as to permit the second engaging means to come into actuating engagement with the face of the shell and cause rotation thereof whereby to bring different parts of the shell material into position to be acted upon by the grinding wheel.

11. A disc-forming machine comprising, in combination, supporting means; a pair of oppositely rotating grinding wheels for simultaneously grinding a disc; a depressable, rotatable spindle between said wheels, to be engaged by the material to be ground; a second rotatable spindle, longitudinally reciprocable, to force the said material into contact with said wheels; mechanism for rotating said wheels and spindles independently of any axial movement of the spindles; manual means for moving the second mentioned spindle toward the first mentioned spindle to cause gripping of the blanks, and hydraulic means whereby reciprocation of the spindles may be controlled.

12. A disc-forming machine comprising, in combination, supporting means; a pair of oppositely rotating grinding wheels for operating simultaneously upon a single piece of work from which a single blank is to be produced; a pair of axially aligned depressible, rotatable spindles between said wheels, to engage the material to be ground; a longitudinally reciprocable, hydraulically actuated piston connected with one of said spindles to cause gripping of the material to be ground and to force it into contact with the rotating grinding wheels; mechanism for preliminarily moving one of the spindles under manual control into a position to grip the work, adjustably, preparatory to initiation of the grinding operation; and mechanism for rotating the wheels and spindles.

13. In a button blanking machine, a material-supporting spindle, and a material-actuating spindle, in combination with mechanism for reciprocating said spindles, said mechanism comprising manual means for moving the second mentioned spindle into material-holding position in cooperation with the first mentioned spindle, and hydraulic means for moving it still farther to carry the work material into grinding position.

14. A structure as defined by claim 13 in which the head of the material-actuating spindle has a serrated engaging face to grip the material, and a yieldable plunger arranged centrally of said serrated face and serving to hold the material after it has been positioned and before the serrated faces engages said material.

JOHN WEBER, Jr.
     WALTER F. WEBER.
     CHARLES F. WEBER.
     JOHN WEBER, Jr.,
Coexecutor with Walter F. Weber of the Estate of John Weber, Sr., Deceased.
     WALTER F. WEBER,
Coexecutor with John Weber, Jr. of the Estate of John Weber, Sr., Deceased.